(12) United States Patent
Saijo et al.

(10) Patent No.: US 10,194,677 B2
(45) Date of Patent: Feb. 5, 2019

(54) PLANT POWDER-CONTAINING WHITE CHOCOLATE-IMPREGNATED FOOD AND METHOD FOR PRODUCING SAME

(71) Applicant: Meiji Co., Ltd., Koto-ku, Tokyo (JP)

(72) Inventors: Aki Saijo, Tsurugashima (JP); Terutaro Shimamura, Tokyo (JP); Hiromitsu Iwanami, Tsurugashima (JP)

(73) Assignee: Meiji Co., Ltd., Tokyo (JP)

( * ) Notice: Subject to any disclaimer, the term of this patent is extended or adjusted under 35 U.S.C. 154(b) by 842 days.

(21) Appl. No.: 14/362,974

(22) PCT Filed: Dec. 26, 2012

(86) PCT No.: PCT/JP2012/083632
§ 371 (c)(1),
(2) Date: Jun. 5, 2014

(87) PCT Pub. No.: WO2013/099933
PCT Pub. Date: Jul. 4, 2013

(65) Prior Publication Data
US 2014/0308403 A1    Oct. 16, 2014

(30) Foreign Application Priority Data
Dec. 27, 2011    (JP) .................................. 2011-285594

(51) Int. Cl.
| | | |
|---|---|---|
| A23G 3/54 | (2006.01) | |
| A23G 3/48 | (2006.01) | |
| A23G 1/30 | (2006.01) | |
| A23G 1/48 | (2006.01) | |
| A23G 1/52 | (2006.01) | |
| A23G 1/54 | (2006.01) | |
| A23L 19/00 | (2016.01) | |
| A21D 13/24 | (2017.01) | |
| A23P 20/00 | (2016.01) | |
| A23P 20/17 | (2016.01) | |
| A23P 30/20 | (2016.01) | |

(52) U.S. Cl.
CPC .............. *A23G 3/54* (2013.01); *A21D 13/24* (2017.01); *A23G 1/305* (2013.01); *A23G 1/48* (2013.01); *A23G 1/52* (2013.01); *A23G 1/54* (2013.01); *A23G 3/48* (2013.01); *A23L 19/01* (2016.08); *A23P 20/00* (2016.08); *A23P 20/17* (2016.08); *A23P 30/20* (2016.08)

(58) Field of Classification Search
CPC ..... A23L 19/01; A21D 13/0009; A23G 1/305; A23G 1/48; A23G 1/52; A23G 1/54; A23G 3/48
See application file for complete search history.

(56) References Cited

U.S. PATENT DOCUMENTS

| | | | | |
|---|---|---|---|---|
| 2010/0303996 | A1* | 12/2010 | Lopez ...................... | A21D 2/18 |
| | | | | 426/601 |
| 2013/0011524 | A1* | 1/2013 | Hareyama .............. | A23G 1/305 |
| | | | | 426/103 |

FOREIGN PATENT DOCUMENTS

| | | |
|---|---|---|
| CN | 1512839 A | 7/2004 |
| JP | 61-173745 A | 8/1986 |
| JP | 9-121770 A | 5/1997 |
| JP | 2000-166498 A | 6/2000 |
| JP | 2003-18961 A | 1/2003 |
| JP | 2004-254529 A | 9/2004 |
| JP | 2008-125394 A | 6/2008 |
| JP | 2008-237102 A | 10/2008 |
| JP | 2010-75055 A | 4/2010 |
| WO | 2011/125451 A1 | 10/2011 |

OTHER PUBLICATIONS

"Guidance for Industry: Standard of Indentity for White Chocolate" Jul. 17, 2008 https://www.fda.gov/Food/GuidanceRegulation/GuidanceDocumentsRegulatoryInformation/LabelingNutrition/ucm059076.htm.*
IPRP and Written Opinion dated Jul. 10, 2014, issued by the International Searching Authority in corresponding application No. PCT/JP2012/083632.
Fuji Sankei Business I, "Calcium-enriched Snack Food 'Shimi Choco Corn Powdered Green Tea", Nippon Kogyo Shinbunsha, Apr. 24, 2007, p. 15.
Shin'ichi Sawamura et al., "Properties and Shapes of Matcha with Various Milling Method", Journal of the Japanese Society for Food Science and Technology, Jul. 2010, pp. 304-309, vol. 57, No. 7.
Fuji Sankei Business I, "Calcium-Enriched Snack Food 'Shimi Choco Corn Strawberry", Nippon Kogyo Shinbunsya, Nov. 2006, p. 17.
International Search Report for PCT/JP2012/083632 dated Mar. 26, 2013.
Chunying Yin et al, "Matcha Tracing and Usage", Tea Science and Technology, vol. 2, Dec. 31, 2008, p. 13-p. 15.

* cited by examiner

*Primary Examiner* — Katherine D Leblanc
(74) *Attorney, Agent, or Firm* — Sughrue Mion, PLLC

(57) ABSTRACT

The present invention provides a white chocolate-impregnated food that is a porous food into which a white chocolate that contains a plant powder is impregnated. A median diameter of the plant powder is 5 to 20 μm. In the white chocolate-impregnated food, the white chocolate that contains the plant powder is impregnated into inside of the porous food.

23 Claims, No Drawings

PLANT POWDER-CONTAINING WHITE CHOCOLATE-IMPREGNATED FOOD AND METHOD FOR PRODUCING SAME

CROSS REFERENCE TO RELATED APPLICATIONS

This application is a National Stage of International Application No. PCT/JP2012/083632 filed Dec. 26, 2012, claiming priority based on Japanese Patent Application No. 2011-285594 filed Dec. 27, 2011, the contents of all of which are incorporated herein by reference in their entirety.

TECHNICAL FIELD

The present invention relates to a food into which a white chocolate that contains a plant powder is impregnated, and a method for producing the same.

BACKGROUND ART

A variety of foods in which a liquid food is impregnated into a porous food (impregnated foods), and methods of producing the same have been studied. In particular, a wide variety of confectionery impregnated with chocolate has been proposed (Patent Literatures 1 to 3).

CITATION LIST

Patent Literature

[Patent Literature 1] Japanese Patent Application Laid-Open Publication No. 2004-254529
[Patent Literature 2] Japanese Patent Application Laid-Open Publication No. 2008-237102
[Patent Literature 3] WO 2011/125451

SUMMARY OF INVENTION

Technical Problem

When white chocolate is impregnated into a porous food, a problem occurs which does not arise when chocolate containing cocoa mass is used. For example, when white chocolate containing not less than 15% by weight of nonfat milk solids is impregnated into a porous food, only the oil content included in the white chocolate is impregnated into the porous food, and coagulated white milk solids tend to remain on the surface of the porous food. The resulting problem is that the porous food is not impregnated with homogeneous white chocolate. Patent Literature 3 proposes means for providing white chocolate that is to be impregnated into a porous food and is milled with a device, such as a bead mill, into particles having a median diameter of 6 μm or less.

Examples of commercially available porous foods impregnated with white chocolate include freeze-dried fruits (strawberries, blackcurrants, and kiwifruits) and potato chips. The porous foods described above are often selected from foods having relatively large bubbles or voids on the surface or in the inside, or materials (foods) whose thickness from the surface to the center region is relatively small.

As for products (impregnated foods) in which a white chocolate that contains freeze-dried strawberries (freeze-dried strawberry product) is impregnated into the center region of the foods, the variety is more limited to such an extent that one can find only an impregnated food in which a flat, crisp-like product of about 5 mm in thick with large bubbles (about 400 to 1500 μm) on the surface is used as a porous food.

In order to meet consumers' needs, more variety has been required in chocolate and materials (porous foods) to be impregnated that are used to produce confectionery impregnated with chocolate (chocolate-impregnated confectionery).

The present invention therefore aims to obtain a food in which a white chocolate that contains powder of a plant (plant powder) is impregnated into a porous food.

Solution to Problem

The inventors of the present invention have found that when plant powder having a particle size obviously smaller than a surface bubble size of a porous food to be impregnated (food to be impregnated) is adjusted to have an even smaller, particular particle size, a white chocolate that contains the plant powder is uniformly impregnated into the porous food. The inventors thus have completed the invention. The present invention is based on the findings and characterized by the matters described below.

(1) A white chocolate-impregnated food in which a porous food is impregnated with a white chocolate that contains a plant powder, wherein a median diameter of the plant powder is 5 to 20 μm.

(2) The white chocolate-impregnated food according to (1), wherein a nonfat milk solids content in the white chocolate is less than 15% by weight.

(3) The white chocolate-impregnated food according to (1) or (2), wherein the plant powder is milled with a wet mill.

(4) The white chocolate-impregnated food according to (3), wherein the wet mill is selected from a refiner and a ball mill.

(5) The white chocolate-impregnated food according to any one of (1) to (4), wherein a plant for a raw material of the plant powder is fruit, vegetable, tea, seed, or herb.

(6) The white chocolate-impregnated food according to (5), wherein the plant is strawberries, tomatoes, or matcha.

(7) The white chocolate-impregnated food according to any one of (1) to (6), wherein the white chocolate that contains the plant powder further contains an emulsifier, and a content of the emulsifier is 0.7 to 1.2% by weight with respect to the white chocolate that contains the plant powder.

(8) The white chocolate-impregnated food according to any one of (1) to (7), wherein the white chocolate that contains the plant powder further contains an acidulant.

(9) The white chocolate-impregnated food according to (8), wherein a content of the acidulant is over 0% by weight to 0.3% by weight with respect to the white chocolate that contains the plant powder.

(10) The white chocolate-impregnated food according to any one of (1) to (9), wherein a bubble size on a surface of the porous food is 100 μm to 1000 μm.

(11) The white chocolate-impregnated food according to any one of (1) to (10), wherein a thickness of the porous food is 3 mm to 25 mm.

(12) A method for producing a white chocolate-impregnated food, the method comprising the steps of:

(a) mixing plant powder and edible oil and fat, and milling the plant powder to obtain plant powder paste in which a median diameter of the plant powder is 5 to 20 μm;

(b) mixing the plant powder paste and white chocolate containing less than 15% by weight of nonfat milk solids to obtain plant powder-containing white chocolate; and (c) impregnating the plant powder-containing white chocolate into a porous food.

(13) The method according to (12), wherein in the step (a), the plant powder is milled using a wet mill.

(14) The method according to (13), wherein the wet mill is selected from a refiner and a ball mill.

(15) The method according to any one of (12) to (14), wherein the step (c) includes a step (c1) of placing the porous food in a sealed container under a reduced pressure conditions, allowing the porous food to come into contact with or be immersed in the plant powder-containing white chocolate, with a reduced pressure state being kept, and returning pressure to atmospheric pressure.

(16) The method according to any one of (12) to (14), wherein the step (c) includes a step (c2) of allowing the porous food to come into contact with or be immersed in the plant powder-containing white chocolate in a sealed container, then, placing the porous food under a reduced pressure conditions, and returning pressure to atmospheric pressure.

(17) The method according to (15) or (16), wherein the step (c) includes a step (c3), following the step (c1) or the step (c2), of placing the porous food under a reduced pressure conditions or a pressurized conditions while being kept in contact with or immersed in the plant powder-containing white chocolate in a sealed container, and returning pressure to atmospheric pressure.

(18) A white chocolate-impregnated food obtained by the method according to any one of (12) to (17).

Advantageous Effects of Invention

The present invention provides a food in which a white chocolate that contains powder of a plant (plant powder) is impregnated into a porous food.

DESCRIPTION OF EMBODIMENTS

Although embodiments for carrying out the present invention will be described below, the present invention is not limited thereto.

The inventors of the present invention have aimed, in particular among the problems to be solved by the present invention, to obtain a food in which a white chocolate that contains an acid component such as a freeze-dried strawberry product and an acidulant is impregnated into a porous food in which the sizes of bubbles on the surface (surface bubble size) are minute.

The inventors of the present invention attempted to impregnate a white chocolate that contains powder of a freeze-dried strawberry product (freeze-dried strawberry powder) into ball-shaped biscuits having a diameter of about 15 mm to 25 mm. However, only the oil content included in the white chocolate was impregnated into the ball-shaped biscuits, and film-like solids adhered to the surfaces of the biscuits. The inventors were not able to obtain a product in which the white chocolate that contains the freeze-dried strawberry powder was uniformly impregnated into the biscuit.

The inventors of the present invention made elaborate studies in order to solve the aforementioned problem. The particle sizes of the white chocolate to impregnate were about 7.5 µm, and the particle sizes of the plant powder were about 30 µm. By contrast, the surface bubble size of the biscuit to be impregnated was 100 µm to 700 µm (an average of 205 µm). The particle sizes of a liquid food to impregnate such as white chocolate were thus sufficiently smaller than the surface bubble size of the food to be impregnated such as a biscuit. The inventors of the present invention studied a variety of pressure reduction conditions in the process (impregnation process) of impregnating the liquid food in the food to be impregnated, and formulations of an emulsifier. The inventors of the present invention, however, were unable to obtain the intended impregnated food easily.

A general purpose of blending plant powder in white chocolate is to add authentic taste of the plant powder. A variety of techniques for finely grinding powder are known. Finely grinding plant powder for blending into white chocolate, however, tends to blur the taste of the plant powder and weaken the flavor. Moreover, it is necessary to introduce facility for finely grinding and to add a step of finely grinding, and the method of finely grinding plant powder is therefore usually not chosen. The inventors of the present invention have found that when plant powder having a particle size obviously smaller than a surface bubble size of a porous food to be impregnated (food to be impregnated) is adjusted to have an even smaller, particular particle size, the white chocolate that contains the plant powder is uniformly impregnated into the porous food.

In a plant powder-containing white chocolate-impregnated food according to the present embodiment, a white chocolate that contains a plant powder is impregnated into a porous food, wherein the median diameter of the plant powder is 5 to 20 µm.

(Plant Powder)

In the present embodiment, the plant powder means powder of a plant that can be taken in as food. Examples of the plant that can be taken in as food include fruits, vegetables, teas, seeds, and herbs.

Examples of the fruits include strawberries, apples, oranges, Japanese oranges, lemons, blueberries, mangos, blackcurrants, pineapples, acerolas, apricots, persimmons, kiwifruits, cherries, pomegranates, watermelons, plums, nashi pears, pears, passion fruits, bananas, loquats, grapes, prunes, melons, peaches, litchis, and raspberries. The fruits are preferably strawberries, oranges, Japanese oranges, blueberries, blackcurrants, or bananas, more preferably strawberries.

Examples of the vegetables include tomatoes, carrots, pumpkins, sweet potatoes, potatoes, sweet peppers, celeries, green peppers, green onions, broccolis, bitter gourds, taros, gumbos, and cucumbers. The vegetables are preferably tomatoes, carrots, pumpkins, or sweet potatoes, more preferably tomatoes.

Examples of the teas include matcha (powder green tea), black tea, green tea, oolong tea, jasmine tea, and oven roasted tea. The teas are preferably matcha, black tea, or jasmine tea, more preferably matcha.

Examples of the seeds include chestnuts, almonds, hazelnuts, macadamia nuts, cashew nuts, pistachios, walnuts, and pine nuts. The seeds are preferably almonds.

Examples of the herbs include mint, rosemary, and basil.

Among the plants listed above, preferred examples are strawberries, tomatoes, and matcha, and especially preferred examples are strawberries and tomatoes.

The median diameter of the plant powder is 5 µm to 20 µm, and particularly preferably 10 µm to 18 µm. In the present embodiment, the median diameter refers to a particle diameter at which a cumulative value in particle size distribution is 50%, when particle size distribution is measured with a laser diffraction particle size analyzer SALD-2200 (SHIMADZU CORPORATION). In the case where a porous food is impregnated with white chocolate in which plant powder having a median diameter exceeding 30 µm has been mixed, only the oil content included in the white chocolate is impregnated into the inside of the porous food, and film-like solids tend to adhere to the surface of the porous food. In the case where a porous food is impregnated with white chocolate in which plant powder having a median diameter of less than 5 μm has been mixed, it is possible to obtain a food in which the white chocolate that contains the plant powder (plant powder-containing white chocolate) is impregnated into the inside of the porous food. The flavor derived from the plant powder in the resultant food, however, tends to be weak.

The plant powder content is preferably 0.5 to 40% by weight with respect to the white chocolate, more preferably 0.5 to 10% by weight, further more preferably 1 to 7% by weight, and the most preferably 3 to 5% by weight. Even outside the range above, the impregnated food can be obtained. However, when impregnation is performed using white chocolate including a plant powder content exceeding 40% by weight, the flavor derived from the plant powder tends to be significantly strong. When impregnation is performed using white chocolate including a plant powder content less than 0.5% by weight, the flavor derived from the plant powder tends to be weak. The plant powder content with respect to the white chocolate may be outside the range above unless the taste of the resultant product and the specifications of the product are adversely affected.

(White Chocolate)

In the present embodiment, the white chocolate is defined as a chocolate containing not less than 21% by weight of cocoa butter and not more than 3% by weight of water with respect to the white chocolate as a whole. Milk solids are optionally included in the white chocolate. The milk solids content is preferably over 0% by weight with respect to the white chocolate as a whole, more preferably not less than 1% by weight, particularly preferably not less than 14% by weight. Fats are optionally included in the milk solids. Preferably, not less than 3% by weight of the fats are included with respect to the milk solids. The cocoa butter includes substitutes for cocoa butter (cocoa butter substitutes).

Examples of raw materials of the white chocolate include a dairy product, sugar, cocoa butter, and an emulsifier. Examples of the dairy product include dry whole milk, skim milk, and cheese powder. Examples of the sugar include monosaccharides and disaccharides such as sucrose (table sugar and powdered sugar), glucose, fructose, maltose, invert sugar and lactose. Examples of the sugar other than those described above include sweeteners with strong sweetness (high-intensity sweetener) such as sucralose, stevia, aspartame, acesulfame K, and saccharin; sugar alcohols such as xylitol, maltitol, erythritol, sorbitol, lactitol, palatinose, and mannitol; and reduced sugar syrup. The cocoa butter may be replaced with cocoa butter substitutes, or mixtures of cocoa butter and cocoa butter substitutes. Examples of the cocoa butter substitutes include tempering fats and non-tempering fats, derived from animals or plants. Examples of the emulsifier include lecithin, glycerin fatty acid esters, and sucrose fatty acid esters. A flavoring or a coloring agent may be added to the white chocolate.

When an acidulant is used as a raw material of the white chocolate, if the amount (content) of the blended acidulant is excessive, film-like solids tend to adhere to the surface of the porous food. It therefore tends to be difficult to obtain an impregnated food (white chocolate-impregnated food) in which homogeneous white chocolate is impregnated into the inside of the porous food. In the present embodiment, the acidulant content is preferably over 0% by weight to 0.3% by weight with respect to the white chocolate that contains the plant powder. Examples of the acidulant include malic acid, citric acid, and tartaric acid, and salts thereof and mixtures thereof.

When an acidulant is blended and/or when an acid plant powder is blended, it is preferable that an emulsifier should be added to the white chocolate or the plant powder-containing white chocolate. The emulsifier content is preferably 0.7 to 1.2% by weight with respect to the white chocolate or the plant powder-containing white chocolate, more preferably 0.8 to 1.1% by weight, particularly preferably 0.8 to 1.0% by weight. Examples of the emulsifier include lecithin generally used in production of chocolate, and mixtures of the lecithin and glycerin fatty acid esters or sucrose fatty acid esters.

The median diameter of particles of the white chocolate is preferably not more than 20 μm, more preferably not more than 10 μm. The lower limit of the median diameter of particles of the white chocolate is preferably, but not limited to, equal to or more than 3 μm. In the present embodiment, the nonfat milk solids content derived from a dairy product is preferably less than 15% by weight with respect to the plant powder-containing white chocolate as a whole. The lower limit of the nonfat milk solids content is preferably, but not limited to, over 0% by weight, more preferably not less than 0.7% by weight, particularly preferably not less than 11% by weight. The nonfat milk solids means milk solids obtained by removing fats from the milk solids.

(Preparation of White Chocolate)

The white chocolate is prepared by an ordinary method using the raw materials described above. The white chocolate may be subjected to conching with a conche. When the white chocolate requires a tempering process, tempering is performed at appropriate temperatures, for example, 30 to 35° C. During tempering, a seeding agent such as BOB (1,3-dibehenoyl-2-oleoyl-sn-glycerol) may be added. An example of the commercially available seeding agent is BOBSTAR (trade name, manufactured by FUJI OIL CO., LTD., a mixture of 50% by weight of BOB powder and 50% by weight of powdered sugar).

(Preparation of Plant Powder, Plant Powder Paste, and Plant Powder-Containing White Chocolate)

The plant powder can be obtained by milling a raw material plant dried by such known means as freeze-drying, or by milling a raw material plant followed by drying by known means. A commercially available plant powder can be used without being processed as long as the median diameter of the plant powder is not more than 20 μm. When a plant raw material having a median diameter exceeding 20 μm is used as the plant powder in the present embodiment, plant powder paste and plant powder-containing white chocolate can be prepared by the methods described below.

Although a dry mill may be used for milling a plant raw material, it is preferable to use a wet mill, and more preferably a refiner, a ball mill, or a bead mill, particularly preferably a refiner or a ball mill is used.

When a dry mill is used, the plant powder-containing white chocolate can be prepared by milling a plant raw material to obtain plant powder having a median diameter of not more than 20 μm, and directly mixing the resultant plant powder into white chocolate. More preferably, the plant powder-containing white chocolate is prepared by mixing the milled plant powder and edible oil and fat in advance to prepare plant powder paste, and mixing the resultant plant powder paste and white chocolate.

When a wet mill is used, the plant powder-containing white chocolate can be prepared by mixing plant powder into white chocolate, followed by milling. In order to suppress deterioration in flavor of the plant powder and to uniformly disperse the plant powder in white chocolate, it is more preferable to prepare plant powder paste by wet-milling plant powder and edible oil and fat mixed in advance, and thereafter mix the resultant plant powder paste with white chocolate.

The edible oil and fat may be one or two or more kinds selected from a variety of vegetable oils such as palm oil, palm kernel oil, rape oil, coconut oil, peanut oil, safflower oil, sunflower oil, shea butter, cottonseed oil, corn oil, soybean oil, rice bran oil, and cocoa butter; a variety of animal fats such as tallow, lard, fish oil, whale oil, and milk fat; and processed oils and fats obtained by subjecting those described above to one or two or more processes selected from hydrogenation, fractionation, and transesterification. White chocolate can be used as the edible oil and fat per se. Preferred examples are palm oil, sunflower oil, shea butter, and mixtures thereof, and white chocolate. More preferred examples are palm oil, sunflower oil, shea butter, and mixtures thereof.

When a ball mill is used for milling, for example, plant powder paste can be obtained as follows. First, plant powder is coarsely milled to obtain plant powder having a particle size of about 100 to 300 μm. The resultant plant powder, edible oil and fat, and an emulsifier are mixed. The resultant mixture is introduced into an attritor-type ball mill (ball diameter: 5 to 10 mm) to obtain plant powder paste in which the median diameter of particles of the plant powder is 15 μm to 30 μm.

When a refiner is used for milling, for example, plant powder paste can be obtained as follows. First, plant powder is coarsely milled to obtain plant powder having a particle size of about 100 μm. The resultant plant powder, edible oil and fat, and an emulsifier are mixed. The resultant mixture is introduced into a refiner to obtain plant powder paste in which the median diameter of particles of the plant powder is 7 μm to 40 μm.

When a bead mill is used for milling, for example, plant powder paste can be obtained as follows. First, plant powder is coarsely milled to obtain plant powder having a particle size of about 30 μm. The resultant plant powder and edible oil and fat are introduced into a bead mill (bead particle diameter: 0.1 to 3.0 mm) and passed through a milling chamber under conditions of product temperature of 30 to 65° C. and rotation speed of 1000 to 2800 rpm. This operation is repeated one to three times consecutively to obtain plant powder paste in which the median diameter of particles of the plant powder is 5 μm to 7 μm.

The viscosity of the plant powder-containing white chocolate is preferably, for example, 6000 to 20000 mPa·s, more preferably 6000 to 10000 mPa·s. In the present embodiment, the viscosity is a value measured using a Brookfield viscometer with a rotor No. 6 under conditions of temperature of 34° C. and rotation speed of 4 rpm.

The lower limit of the oil content in the plant powder-containing white chocolate is preferably not less than 35% by weight, more preferably not less than 37% by weight, particularly preferably not less than 40% by weight. The upper limit of the oil content in the plant powder-containing white chocolate is, for example, but not limited to, not more than 80% by weight.

(Porous Food)

In the present embodiment, a porous food refers to a food having a porous space inside thereof. Examples of the porous food include freeze-dried products of fruits, vegetables, seafood, livestock meats, eggs, and molded foods (molded mixtures of various raw materials); puffed foods such as puffed snacks produced by deep-frying, puffing pellets with hot air, or cooking or puffing raw materials with an extruder; and baked confectionery such as arare (small pieces of baked rice cake), okoshi (snacks made of steamed, dried, and parched rice and other ingredients bound with sugar), karinto (cruller made from flour), wafers, croutons, meringues, biscuits, pies, cookies, sable, sponge cakes, and pretzels. Other examples include breads such as bread and French bread, doughnuts, waffles, and kori-dofu (freeze-dried tofu). In the present embodiment, preferred porous foods are biscuits, sponge cakes, puffed foods, and pretzels.

The surface bubble size of the porous food in the present embodiment means a numerical range from the minimum value to the maximum value that is obtained by observing the surface of the porous food with a scanning electron microscope (a magnification of about ×30) and measuring the diameters (the maximum longer diameter) of bubbles at 50 points in the image. The surface bubble size of the porous food having a surface apparently obviously different in bubble size distribution (for example, pretzel pieces partially including a surface smoothed by alkaline treatment) is obtained by selectively observing a surface on which an apparently large bubble size is present. The surface bubble size of the porous food in the present embodiment is preferably 100 μm to 1000 μm, more preferably 100 μm to 700 μm.

The thickness of the porous food in the present embodiment means the thickness of the apparently thinnest part of the porous food. The thickness of the porous food in the present embodiment is preferably 3 mm to 25 mm, more preferably 5 mm to 25 mm, further more preferably 8 to 20 mm.

(Production of Plant Powder-Containing White Chocolate-Impregnated Food)

There are mainly two methods of impregnation that are used to produce the white chocolate-impregnated food in the present embodiment: (1) an impregnation method using a pressure difference; and (2) an impregnation method using centrifugal force.

Examples of (1) the impregnation methods using a pressure difference include:

(A) a method wherein the porous food is brought into contact with or immersed in the plant powder-containing white chocolate in a melted state thereafter subjected to a reduced pressure, and the pressure is returned to atmospheric pressure;

(B) a method wherein after the porous food is subjected to a reduced pressure, the porous food is brought into contact with or immersed in the plant powder-containing white chocolate in a melted state under the reduced pressure, and the pressure is returned to atmospheric pressure;

(C) a method wherein after the step (A) or (B), the pressure is increased (pressurized) to a pressure higher than atmospheric pressure and returned to atmospheric pressure; and (D) a method wherein after the step (A) or (B), the pressure is reduced again and returned to atmospheric pressure;

(E) a method wherein after the porous food is brought into contact with or immersed in the plant powder-containing white chocolate in a melted state, the pressure is increased to a pressure higher than atmospheric pressure and returned to atmospheric pressure; and (F) a method wherein after the step (E), the pressure is reduced and returned to atmospheric pressure.

When the pressure is reduced in the methods above, the pressure is reduced by a vacuum pump, and the lowest pressure reached in a sealed system such as a sealed container is, for example, 5 kPa to 70 kPa (the absolute pressure is shown when absolute vacuum is 0 MPa, and the pressures shown below are also expressed in the same way). In the methods described above, when the pressure is increased to a pressure higher than atmospheric pressure, compressed air or nitrogen gas is introduced into an impregnation tank (into a sealed container) to attain a maximum pressure of, for example, 200 kPa to 1000 kPa. At a stage when the pressure is returned to atmospheric pressure at the end of each step, the porous food may be kept in contact with or immersed in the plant powder-containing white chocolate in a melted state, or the contact or immersed state may be removed. After the impregnation methods described above are carried out, the excess plant powder-containing white chocolate may be removed from the surface of the resultant white chocolate-impregnated food, for example, by centrifugal separation or air blowing.

(2) Examples of the impregnation method using centrifugal force are shown below. The plant powder-containing white chocolate in a melted state is applied to the surface of the porous food, or the porous food is immersed in the plant powder-containing white chocolate in a melted state. The porous food in contact with the plant powder-containing white chocolate is placed in a centrifuge for centrifugal separation at atmospheric pressure. The plant powder-containing white chocolate may be added and brought into contact the porous food after the porous food is placed in a centrifuge and centrifugal separation is started. The spin speed for centrifugal separation is preferably, for example, 100 to 4000 rpm. The time for centrifugal separation can be set appropriately considering the properties of the porous food and the plant powder-containing white chocolate.

The white chocolate-impregnated food obtained by the impregnation methods described above is cooled and solidified at 15° C. or lower. The white chocolate-impregnated food in the present embodiment may be further processed as necessary by know methods including additional coating and topping.

The present embodiment can provide a food in which a white chocolate that contains a plant powder is uniformly impregnated into a wide variety of porous foods including a variety of baked confectionery having a minute surface bubble size. Examples used as the plant powder include fruits such as strawberries, apples, oranges, Japanese oranges, lemons, and blueberries; vegetables such as tomatoes, carrots, and gingers; teas such as matcha, green tea, and black tea; seeds such as chestnuts, almonds, hazel nuts, and macadamia nuts; and herbs such as mint, rosemary, and basil. The food impregnated with white chocolate therefore has not only the flavor given by flavorings alone but also the authentic taste of materials derived from the plant powders. In particular, even when the white chocolate used contains acid plant powders of strawberries and tomatoes and/or components such as acidulants, which are difficult to be impregnated into a porous food having a minute surface bubble size, the white chocolate does not separate on the surface of the porous food and can be impregnated as a homogeneous ingredient.

EXAMPLES

Although the present invention will be specifically described below with Examples, the present invention is not limited to the Examples.

Example 1 Production of Impregnated Food (1) Median Diameter of Plant Powder

<(a) Preparation of Plant Powder Paste>

40% by weight of freeze-dried strawberry powder (manufactured by MEIJI SHOKUHIN KAISHA, LTD., the particle sizes: about 100 to 300 μm), 59.5% by weight of edible oil and fat (palm oil and sunflower oil), and 0.5% by weight of lecithin were mixed. The resultant mixture was milled for six hours using an attritor-type ball mill (manufactured by MITSUI MIIKE MACHINERY CO., LTD., ball diameter: 9.5 mm) to prepare a strawberry paste 1. A strawberry paste 2 was prepared by the same method by milling for eight hours. The median diameter of the strawberry paste 1 was 18 μm, and the median diameter of the strawberry paste 2 was 16 μm.

40% by weight of freeze-dried strawberry powder (manufactured by MEIJI SHOKUHIN KAISHA, LTD., the particle sizes: about 100 μm), 30% by weight of edible oil and fat (palm oil and sunflower oil), and 0.5% by weight of lecithin were mixed. The resultant mixture was milled using a refiner and thereafter additionally mixed with 29.5% by weight of the aforementioned edible oil and fat to prepare a strawberry paste 3. The median diameter of the strawberry paste 3 was 10 μm.

40% by weight of freeze-dried strawberry powder (manufactured by MEIJI SHOKUHIN KAISHA, LTD., the particle sizes: about 100 μm), 59.5% by weight of edible oil and fat (palm oil and sunflower oil), and 0.5% by weight of lecithin were mixed. The resultant mixture was milled for 90 minutes using an attritor-type ball mill (manufactured by MITSUI MIIKE MACHINERY CO., LTD., ball diameter: 9.5 mm) to prepare a strawberry paste 4. The median diameter of the strawberry paste 4 was 30 μm.

<(b) Preparation of Plant Powder-Containing White Chocolate>

19% by weight of dry whole milk, 40.3% by weight of table sugar, 10% by weight of lactose, 30% by weight of cocoa butter, 0.5% by weight of lecithin, and 0.2% by weight of sucrose fatty acid ester were mixed by an ordinary method. The resultant mixture was processed with a refiner to prepare a white chocolate base having 13% by weight of nonfat milk solids and 37% by weight of oil content. The median diameter of the resultant white chocolate base was 7.5 μm.

To the white chocolate base (84.2% by weight) tempered to 30 to 35° C., 7.5% by weight of the strawberry paste 1, 3.0% by weight of BOB (under the trade name "BOBSTAR" manufactured by FUJI OIL CO., LTD.), 0.3% by weight of glycerin fatty acid ester (HLB value: 2 to 3), and 5.0% by weight of edible oil and fat (palm oil and sunflower oil) were added and mixed to prepare a strawberry powder-containing white chocolate 1 having an oil content of 42% by weight. Strawberry powder-containing white chocolates 2 to 4 were prepared by the same method as described above except that the strawberry pastes 2 to 4, respectively, were used in place of the strawberry paste 1. The viscosities of the strawberry powder-containing white chocolates 1 to 4 were 8000 to 15000 mPa·s.

<(c) Impregnation Step>

(Production of Porous Food (Biscuit))

20% by weight of chicken egg, 16% by weight of table sugar, 12% by weight of emulsified oil and fat, 0.2% by weight of an emulsifier, and 20.1% by weight of water were well mixed and stirred. 31% by weight of flour and 0.7% by weight of baking powder were added to the resultant mixture and mixed to obtain biscuit dough. The biscuit dough was put into a metal mold, baked at 190° C. for nine minutes, and dried at 100° C. for 30 minutes to obtain an approximately ball-shaped biscuit having a diameter (thickness) of about 20 to 25 mm. The surface bubble size of the biscuit was 100 to 700 µm (an average of 205 µm).

(Production of Impregnated Food: (c1) Pressure Reducing Step to (c3) Pressurizing Step)

The biscuit put into a basket was placed in a sealed container, and the pressure was reduced to 6 kPa (absolute pressure). With the reduced pressure state being kept, the basket was soaked in the strawberry powder-containing white chocolate 1 in a melted state held at 32° C. to 33° C. Immediately after the soaking, the pressure was gradually released and returned to atmospheric pressure. With the basket being soaked, the space in the sealed container was fed with compressed air and thereby pressurized to 300 kPa (absolute pressure). After the pressure was gradually released and returned to atmospheric pressure, the basket was taken out. The biscuit obtained through the process above was taken out from the sealed container, and the excess strawberry powder-containing white chocolate 1 that adhered to the surface of the biscuit was removed by centrifugal separation. The resultant biscuit was cooled and solidified at 15° C. to obtain a strawberry powder-containing white chocolate-impregnated biscuit 1. Strawberry powder-containing white chocolate-impregnated biscuits 2 to 4 were obtained by the same method as described above except that the strawberry powder-containing white chocolates 2 to 4, respectively, were used in place of the strawberry powder-containing white chocolate 1.

<Quality Evaluation of Impregnated Foods>

The surface states and the cut insides of the strawberry powder-containing white chocolate-impregnated biscuits 1 to 4 were observed, and the results of observation are shown in Table 1. With respect to the surface state, whether film-like solids were present was observed. A case where film-like solids adhere was evaluated as poor impregnation (B), and a case where there were no solids was evaluated as good impregnation (A). The impregnated foods (impregnated biscuits) were cut, and the states of the strawberry powder-containing white chocolate inside the impregnated foods were observed. A case where the strawberry powder-containing white chocolate reached the vicinity of the center region of the impregnated food was evaluated as good impregnation (A), and a case where the strawberry powder-containing white chocolate did not permeate into the impregnated food was evaluated as poor impregnation (B).

TABLE 1

| | Strawberry powder-containing white chocolate-impregnated biscuit | | | |
|---|---|---|---|---|
| | 1 Strawberry paste 1 (18 µm) | 2 Strawberry paste 2 (16 µm) | 3 Strawberry paste 3 (10 µm) | 4 Strawberry paste 4 (30 µm) |
| Surface state | A | A | A | B |
| Cut inside | A | A | A | B |

As can be understood from the results in Table 1, when the plant powder (freeze-dried strawberry powder) has a median diameter of 10 to 18 µm, it is possible to obtain a food in which the plant powder-containing white chocolate is impregnated into the porous food (biscuit having a thickness of 20 to 25 mm and a surface bubble size of 100 to 700 µm (an average of 205 µm)). The plant powder (freeze-dried strawberry powder) having a median diameter of 30 µm is sufficiently smaller than the surface bubble size of the biscuit but does not result in the intended impregnated food.

Example 2 Production of Impregnated Food (2) Addition of Acidulant

<(a) Preparation of Plant Powder Paste>

A strawberry paste 1 (median diameter: 18 µm) and a strawberry paste 4 (median diameter: 30 µm) were prepared by the method described in Example 1.

<(b) Preparation of Plant Powder-Containing White Chocolate>

A white chocolate base was prepared by the method described in Example 1. To 84.2% by weight of the white chocolate base, 7.5% by weight of the strawberry paste 1, 3.0% by weight of BOB, 0.3% by weight of glycerin fatty acid ester (HLB value: 2 to 3), 0.3% by weight of acidulant (malic acid), and 4.7% by weight of edible oil and fat (palm oil and sunflower oil) were added and mixed to obtain a strawberry powder-containing white chocolate 5 having an oil content of 42% by weight.

To 84.2% by weight of the white chocolate base, 7.5% by weight of the strawberry paste 1, 3.0% by weight of BOB, 0.3% by weight of glycerin fatty acid ester (HLB value: 2 to 3), 0.2% by weight of acidulant (malic acid), and 4.8% by weight of edible oil and fat (palm oil and sunflower oil) were added and mixed to obtain a strawberry powder-containing white chocolate 6 having an oil content of 42% by weight.

A strawberry powder-containing white chocolate 7 having an oil content of 42% by weight was prepared by the method of preparing the strawberry powder-containing white chocolate 5 except that the strawberry paste 4 was used in place of the strawberry paste 1.

<(c) Impregnation Step>

After a biscuit was prepared by the method described in Example 1, impregnated foods (strawberry powder-containing white chocolate-impregnated biscuits 5 to 7) were produced.

<Quality Evaluation of Impregnated Foods>

Evaluations were made in the same manner as in Example 1. The results are shown in Table 2.

TABLE 2

| | Strawberry powder-containing white chocolate-impregnated biscuit | | |
|---|---|---|---|
| | 5 Strawberry paste 1 (18 µm) | 6 Strawberry paste 1 (18 µm) | 7 Strawberry paste 4 (30 µm) |
| Acidulant (malic acid) | 0.3% by weight | 0.2% by weight | 0.3% by weight |
| Surface state | A | A | B |
| Cut inside | A | A | B |

As can be understood from the results in Table 2, when the strawberry powder-containing white chocolates 5 and 6 containing 0.2% by weight to 0.3% by weight of acidulant are used, it is possible to obtain a food in which the plant powder-containing white chocolate is impregnated into the porous food (biscuit having a thickness of 20 to 25 mm and a surface bubble size of 100 to 700 µm (an average of 205 µm)).

Example 3 Production of Impregnated Food (3) Blended Amount of Plant Powder

<(a) Preparation of Plant Powder Paste>

A strawberry paste 1 (median diameter: 18 μm) was prepared by the method described in Example 1.

<(b) Preparation of Plant Powder-Containing White Chocolate>

A white chocolate base was prepared by the method described in Example 1. To the white chocolate base (84.2% by weight), 2.5% by weight of the strawberry paste 1, 3.0% by weight of BOB, 0.3% by weight of glycerin fatty acid ester, and 10.0% by weight of edible oil and fat (palm oil and sunflower oil) were added and mixed to obtain a strawberry powder-containing white chocolate 8 having an oil content of 42% by weight.

Similarly, 7.5% by weight of the strawberry paste 1, 3.0% by weight of BOB, 0.3% by weight of glycerin fatty acid ester (HLB value: 2 to 3), and 5.0% by weight of edible oil and fat (palm oil and sunflower oil) were added to the white chocolate base (84.2% by weight) and mixed to obtain a strawberry powder-containing white chocolate 9 having an oil content of 42% by weight.

Similarly, 11.9% by weight of the strawberry paste 1, 3.0% by weight of BOB, 0.3% by weight of glycerin fatty acid ester, and 0.6% by weight of edible oil and fat (palm oil and sunflower oil) were added to the white chocolate base (84.2% by weight) and mixed to obtain a strawberry powder-containing white chocolate 10 having an oil content of 41% by weight.

A white chocolate base was prepared by the method described in Example 1. To the white chocolate base (79.0% by weight), 17.7% by weight of the strawberry paste 1, 3.0% by weight of BOB, and 0.3% by weight of glycerin fatty acid ester were added and mixed to obtain a strawberry powder-containing white chocolate 11 having an oil content of 42% by weight.

<(c) Impregnation Step>

A biscuit was prepared by the method described in Example 1.

(Production of Impregnated Food: (c1) Pressure Reducing Step to (c3) Pressure Reducing Step)

The biscuit put into a basket was placed in a sealed container, and the pressure was reduced to 6 kPa (absolute pressure). With the reduced pressure state being kept, the basket was soaked in the strawberry powder-containing white chocolate 8 in a melted state held at 32° C. to 33° C. Immediately after the soaking, the pressure was gradually released and returned to atmospheric pressure. With the basket being soaked, the pressure was reduced again to 6 kPa (absolute pressure). Immediately after the aforementioned pressure being reached, the pressure was gradually released and returned to atmospheric pressure, and the basket was taken out. The biscuit obtained through the process above was taken out from the sealed container, and the excess strawberry powder-containing white chocolate that adhered to the surface of the biscuit was removed by centrifugal separation. The resultant biscuit was cooled and solidified at 15° C. to obtain an impregnated food (strawberry powder-containing white chocolate-impregnated biscuit 8). Strawberry powder-containing white chocolate-impregnated biscuits 9 to 11 were obtained by the same method as described above except that the strawberry powder-containing white chocolates 9 to 11, respectively, were used in place of the strawberry powder-containing white chocolate 8.

<Quality Evaluation of Impregnated Foods>

Evaluations were made in the same manner as in Example 1. The results are shown in Table 3.

TABLE 3

|  | Strawberry powder-containing white chocolate-impregnated biscuit | | | |
|---|---|---|---|---|
|  | 8 | 9 | 10 | 11 |
| Strawberry paste 1 (18 μm) (% by weight) | 2.5 | 7.5 | 11.9 | 17.7 |
| Plant powder content (% by weight) in plant powder-containing white chocolate | 1.0 | 3.0 | 4.8 | 7.1 |
| Surface state | A | A | A | A |
| Cut inside | A | A | A | A |

As can be understood from the results in Table 3, when 1 to 7% by weight of the plant powder (freeze-dried strawberry powder) is included in the white chocolate, it is possible to obtain a food in which the plant powder-containing white chocolate is impregnated into the inside of the porous food (biscuit having a thickness of 20 to 25 mm and a surface bubble size of 100 to 700 μm (an average of 205 μm)). All of the resultant impregnated foods have a good flavor. In particular, as for the impregnated foods containing 3.0 to 4.8% by weight of the plant powder, the tastes of strawberry and white chocolate are well balanced.

Example 4 Production of Impregnated Food (4) Porous Foods Different in Surface Bubble Size <(a) Preparation of Plant Powder Paste>

A strawberry paste 1 (median diameter: 18 μm) was prepared by the method described in Example 1.

<(b) Preparation of Plant Powder-Containing White Chocolate>

A strawberry powder-containing white chocolate 1 was prepared by the method described in Example 1.

<(c) Impregnation Step>

(Production of Porous Food (Puff))

Raw materials including 79.5% by weight of flour, 10.9% by weight of table sugar, 5% by weight of skim milk, 0.5% by weight of salt, 2.95% by weight of shortening, 0.5% by weight of an emulsifier, 0.6% by weight of dried whole egg, and 0.05% by weight of baking powder were charged into a feed inlet of a twin screw extruder (TEM 50B manufactured by TOSHIBA MACHINE CO., LTD). The raw material mixture was discharged from a rectangular nozzle hole of about 9 mm×9 mm equipped at the tip end of the extruder to obtain porous rope-like puff dough having an approximately rectangular cross section. The operation conditions of the extruder were the amount of added water: 3.8 kg/hr, the speed of screw revolution: 410 rpm, the internal pressure: 52 kgf/cm$^2$, and the material temperature: 170° C. The resultant puff dough was cut into 16 to 20 mm. The cut puff dough was left cool until the product temperature reached room temperature to obtain an approximately cubic-shaped puff of about 16 to 20 mm. The surface bubble size of the puff was 300 μm to 1000 μm. The surface bubble size was measured at the cut surface of the puff.

(Production of Porous Food (Dried Sponge))

23% by weight of chicken egg, 17% by weight of table sugar, 13% by weight of emulsified oil, and 17% by weight of water were well mixed and stirred. 30% by weight of flour was added to the resultant mixture and mixed to obtain sponge dough. The sponge dough was put into a metal mold, baked at 190° C. for eight minutes, and dried at 100° C. for 30 minutes to obtain a dried sponge of about 8 to 10 mm×about 13 to 15 mm×about 30 to 33 mm. The surface bubble size of the dried sponge was 100 μm to 250 μm.

(Production of Porous Food (Pretzel))

Pretzel pieces manufactured by Snyder's-Lance. Inc. were used. The sizes of the pretzel pieces were about 3 mm to 20 mm, and the surface bubble size was 100 μm to 400 μm (an average of 186 μm). The surface bubble size was measured by selecting a crushed surface of the pretzel piece.

As for the puff, an impregnated food was produced in accordance with Example 3 ((c1) pressure reducing step to (c3) pressure reducing step). As for the dried sponge and the pretzel, impregnated foods were produced in accordance with Example 1 ((c1) pressure reducing step to (c3) pressurizing step).

<Quality Evaluation of Impregnated Foods>

Evaluations were made in the same manner as in Example 1. The results are shown in Table 4. For comparison, the evaluation results of the strawberry powder-containing white chocolate-impregnated biscuit 1 (biscuit 1) produced in Example 1 are also shown in Table 4.

TABLE 4

| | Strawberry powder-containing white chocolate-impregnated food | | | |
|---|---|---|---|---|
| | Puff | Dried sponge | Pretzel | Example 1 (biscuit 1) |
| Surface bubble size (μm) | 300 to 1000 | 100 to 250 | 100 to 400 | 100 to 700 |
| Thickness (mm) | 16 to 20 | 8 to 10 | 3 to 20 | 20 to 25 |
| Surface state | A | A | A | A |
| Cut inside | A | A | A | A |

As can be understood from the results in Table 1 and Table 4, when the surface bubble size of the porous food is 100 μm to 1000 μm and the thickness of the porous food is 3 mm to 25 mm, it is possible to obtain a food in which the plant powder (freeze-dried strawberry powder)-containing white chocolate is impregnated into the porous food.

Example 5 Production of Impregnated Food (5) Use of Various Plant Powders (Tomato, Matcha)

<(a) Preparation of Plant Powder Paste>

40% by weight of freeze-dried tomato powder (manufactured by MEIJI SHOKUHIN KAISHA, LTD., the particle sizes: about 100 μm), 59.5% by weight of edible oil and fat (palm oil and sunflower oil), and 0.5% by weight of lecithin were mixed. The resultant mixture was milled for six hours using an attritor-type ball mill (manufactured by MITSUI MIIKE MACHINERY CO., LTD., ball diameter: 9.5 mm) to prepare a tomato paste 1. The median diameter of the tomato paste 1 was 18 μm.

A tomato paste 2 was prepared by mixing 40% by weight of freeze-dried tomato powder, 59.5% by weight of the aforementioned edible oil and fat, and 0.5% by weight of lecithin, without the milling process above. The median diameter of the tomato paste 2 was 100 μm.

<(b) Preparation of Plant Powder-Containing White Chocolate>

A white chocolate base was prepared by the method described in Example 1. To 84.2% by weight of the white chocolate base, 7.5% by weight of the tomato paste 1 or the tomato paste 2, 3.0% by weight of BOB, 0.3% by weight of glycerin fatty acid ester (HLB value: 2 to 3), and 5.0% by weight of edible oil and fat (palm oil and sunflower oil) were added and mixed to obtain a tomato powder-containing white chocolate 1 and a tomato powder-containing white chocolate 2 each having an oil content of 42% by weight.

To 84.2% by weight of the white chocolate base, 3.0% by weight of BOB, 0.3% by weight of glycerin fatty acid ester (HLB: 2 to 3), 3.0% by weight of matcha powder (manufactured by Aiya Japan Corporation, median diameter: 10 μm), 9.46% by weight of edible oil and fat (palm oil and sunflower oil), and 0.04% by weight of lecithin were added and mixed to obtain a matcha powder-containing white chocolate having an oil content of 42% by weight.

<(c) Impregnation Step>

After a biscuit was prepared by the method described in Example 1, impregnated foods using the tomato powder-containing white chocolate 1, the tomato powder-containing white chocolate 2, or the matcha powder-containing white chocolate were produced.

<Quality Evaluation of Impregnated Foods>

Evaluations were made in the same manner as in Example 1. The results are shown in Table 5.

TABLE 5

| | Tomato powder or matcha powder-containing white chocolate-impregnated biscuit | | |
|---|---|---|---|
| | Tomato | | Matcha |
| | Tomato paste 1 (18 μm) | Tomato paste 2 (100 μm) | Matcha powder (10 μm) |
| Surface state | A | B | A |
| Cut inside | A | B | A |

As can be understood from the results in Table 5, when the white chocolate that contains powder of vegetables such as tomatoes or teas such as matcha is used, it is possible to obtain a food in which the plant powder-containing white chocolate is impregnated into the porous food (biscuit having a thickness of 20 to 25 mm and a surface bubble size of 100 to 700 μm (an average of 205 μm)).

The invention claimed is:

1. A white chocolate-impregnated food in which a porous food is impregnated with a white chocolate that contains a plant powder, wherein a median diameter of the plant powder is 5 to 20 μm,
    wherein a nonfat milk solids content in the white chocolate is from 0.7% by weight to less than 15% by weight,
    wherein a bubble size on a surface of the porous food is 100 μm to 1000 μm,
    wherein a thickness of the porous food is 3 mm to 25 mm, and
    wherein the impregnated material of the white chocolate containing the plant powder is homogeneous.

2. The white chocolate-impregnated food according to claim 1, wherein the plant powder is milled with a wet mill.

3. The white chocolate-impregnated food according to claim 2, wherein the wet mill is selected from a refiner and a ball mill.

4. The white chocolate-impregnated food according to claim 1, wherein a plant for a raw material of the plant powder is fruits, vegetables, teas, seeds, or herbs.

5. The white chocolate-impregnated food according to claim 4, wherein the plant is strawberries, tomatoes, or matcha.

6. The white chocolate-impregnated food according to claim 1, wherein the white chocolate that contains the plant powder further contains an emulsifier, and a content of the emulsifier is 0.7 to 1.2% by weight with respect to the white chocolate that contains the plant powder.

7. The white chocolate-impregnated food according to claim 1, wherein the white chocolate that contains the plant powder further contains an acidulant.

8. The white chocolate-impregnated food according to claim 7, wherein a content of the acidulant is over 0% by weight to 0.3% by weight with respect to the white chocolate that contains the plant powder.

9. A white chocolate-impregnated food in which a porous food is impregnated with a white chocolate that contains a plant powder, wherein the impregnated material of the white chocolate containing the plant powder is homogeneous, wherein a median diameter of the plant powder is 5 to 20 µm,
- a nonfat milk solids content in the white chocolate is from 0.7% by weight to less than 15% by weight,
- the plant is strawberries, tomatoes, or matcha,
- the white chocolate that contains the plant powder further contains an emulsifier, and a content of the emulsifier is 0.7 to 1.2% by weight with respect to the white chocolate that contains the plant powder,
- the white chocolate that contains the plant powder further contains an acidulant, and a content of the acidulant is over 0% by weight to 0.3% by weight with respect to the white chocolate that contains the plant powder,
- a bubble size on a surface of the porous food is 100 µm to 1000 µm, and
- a thickness of the porous food is 3 mm to 25 mm.

10. The white chocolate-impregnated food according to claim 4, wherein the plant is strawberries or tomatoes.

11. The white chocolate-impregnated food according to claim 9, wherein a median diameter of the plant powder is 10 to 18 µm.

12. A white chocolate-impregnated food is which a porous food is impregnated with a white chocolate that contains a plant powder, wherein the impregnated material of the white chocolate containing the plant powder is homogeneous, wherein a median diameter of the plant powder is 5 to 20 µm,
- a nonfat milk solids content in the white chocolate is from 0.7% by weight to less than 15% by weight,
- the plant is strawberries or tomatoes,
- the white chocolate that contains the plant powder further contains an emulsifier, and a content of the emulsifier is 0.7 to 1.2% by weight with respect to the white chocolate that contains the plant powder,
- the white chocolate that contains the plant powder further contains an acidulant, and a content of the acidulant is over 0% by weight to 0.3% by weight with respect to the white chocolate that contains the plant powder,
- a bubble size on a surface of the porous food is 100 µm to 1000 µm, and a thickness of the porous food is 3 mm to 25 mm.

13. The white chocolate-impregnated food according to claim 12, wherein a median diameter of the plant powder is 10 to 18 µm.

14. The white chocolate-impregnated food according to claim 1, wherein a median diameter of particles of the white chocolate is not more than 20 µm.

15. The white chocolate-impregnated food according to claim 9, wherein a median diameter of particles of the white chocolate is not more than 20 µm.

16. The white chocolate-impregnated food according to claim 12, wherein a median diameter of particles of the white chocolate is not more than 20 µm.

17. A method for producing the white chocolate-impregnated food according to claim 1, the method comprising the steps of:
- (a) mixing plant powder and edible oil and fat, and milling the plant powder to obtain plant powder paste in which a median diameter of the plant powder is 5 to 20 µm;
- (b) mixing the plant powder paste and white chocolate containing from 0.7% by weight to less than 15% by weight of nonfat milk solids to obtain plant powder-containing white chocolate; and
- (c) impregnating the plant powder-containing white chocolate into a porous food,
- wherein the impregnated material of the white chocolate containing the plant powder is homogeneous.

18. The method according to claim 17, wherein in the step (a), the plant powder is milled using a wet mill.

19. The method according to claim 18, wherein the wet mill is selected from a refiner and a ball mill.

20. The method according to claim 17, wherein the step (c) includes a step (c1) of placing the porous food in a sealed container under a reduced pressure conditions, allowing the porous food to come into contact with or be immersed in the plant powder-containing white chocolate, with a reduced pressure state being kept, and returning pressure to atmospheric pressure.

21. The method according to claim 17, wherein the step (c) includes a step (c2) of allowing the porous food to come into contact with or be immersed in the plant powder-containing white chocolate in a sealed container, then, placing the porous food under a reduced pressure conditions and returning pressure to atmospheric pressure.

22. The method according to claim 20, wherein the step (c) includes a step (c3), following the step (c1), of placing the porous food under a reduced pressure conditions or a pressurized conditions while being kept in contact with or immersed in the plant powder-containing white chocolate in a sealed container, and returning pressure to atmospheric pressure.

23. The method according to claim 21, wherein the step (c) includes a step (c3), following the step (c2), of placing the porous food under a reduced pressure conditions or a pressurized conditions while being kept in contact with or immersed in the plant powder-containing white chocolate in a sealed container, and returning pressure to atmospheric pressure.

\* \* \* \* \*